US010489568B2

(12) United States Patent
Wang et al.

(10) Patent No.: US 10,489,568 B2
(45) Date of Patent: Nov. 26, 2019

(54) APPARATUS AND METHODS FOR IMPROVING TERMINAL SECURITY

(71) Applicant: Huawei Technologies Co., Ltd., Shenzhen (CN)

(72) Inventors: Xiyong Wang, Shenzhen (CN); Hongrui Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 15/528,309

(22) PCT Filed: Nov. 12, 2015

(86) PCT No.: PCT/CN2015/094457
§ 371 (c)(1),
(2) Date: May 19, 2017

(87) PCT Pub. No.: WO2016/078541
PCT Pub. Date: May 26, 2016

(65) Prior Publication Data
US 2017/0316194 A1 Nov. 2, 2017

(30) Foreign Application Priority Data
Nov. 20, 2014 (CN) .......................... 2014 1 0668497

(51) Int. Cl.
G06F 21/32 (2013.01)
G06F 21/10 (2013.01)
(Continued)

(52) U.S. Cl.
CPC .............. *G06F 21/32* (2013.01); *G06F 21/10* (2013.01); *G06F 21/40* (2013.01); *G06F 21/84* (2013.01)

(58) Field of Classification Search
CPC .......... G06F 21/32; G06F 21/10; G06F 21/40; G06F 21/84
See application file for complete search history.

(56) References Cited

U.S. PATENT DOCUMENTS 6,249,815 B1 * 6/2001 Foladare ................. H04L 67/16
709/203
6,671,672 B1 * 12/2003 Heck ....................... G10L 17/24
704/273

(Continued)

FOREIGN PATENT DOCUMENTS

CN 1997188 A 7/2007
CN 102930221 A 2/2013
(Continued)

OTHER PUBLICATIONS

Anonymous, "Notes and Security Measures in Sharing PC Between Family Members," Dec. 1, 2011, total 4 pages with 2 pages English translation Retrieved from Internet URL:https://www.is702.jp/special/1039.

Primary Examiner — Sher A Khan
(74) Attorney, Agent, or Firm — Slater Matsil, LLP

(57) ABSTRACT

A method is provided that includes: displaying, by the terminal, a randomly generated dynamic password on a display interface, and starting a voice receiving device of the terminal; obtaining by using the voice receiving device, voice information when a user reads the dynamic password, converting the voice information into a text password, and extracting a voiceprint feature of the voice information; and when the text password is the same as the dynamic password, determining terminal usage permission of the user according to a prestored correspondence between terminal usage permission and a voiceprint feature, and setting the display interface to an unlocked or locked state according to the determined terminal usage permission; or setting the (Continued)

display interface to a locked state when the text password is different from the dynamic password.

13 Claims, 5 Drawing Sheets

(51) Int. Cl.
*G06F 21/84* (2013.01)
*G06F 21/40* (2013.01)

(56) References Cited

U.S. PATENT DOCUMENTS

| | | | | |
|---|---|---|---|---|
| 8,499,342 | B1* | 7/2013 | Macwan | H04L 63/0861 713/168 |
| 2001/0000045 | A1* | 3/2001 | Yu | G06F 21/32 |
| 2003/0135740 | A1* | 7/2003 | Talmor | G06F 21/32 713/186 |
| 2004/0088587 | A1* | 5/2004 | Ramaswamy | G06F 21/31 726/5 |
| 2004/0186725 | A1 | 9/2004 | Maruyama | |
| 2005/0089172 | A1* | 4/2005 | Fujimoto | G06F 21/32 380/275 |
| 2006/0136219 | A1 | 6/2006 | Wang | |
| 2006/0140620 | A1* | 6/2006 | Fujii | G03B 17/02 396/287 |
| 2010/0106975 | A1* | 4/2010 | Vandervort | G06F 21/32 713/186 |
| 2011/0047607 | A1* | 2/2011 | Chen | G06F 21/43 726/7 |
| 2012/0086806 | A1 | 4/2012 | Hiramine et al. | |
| 2012/0257797 | A1* | 10/2012 | Leyvand | G06K 9/00221 382/118 |
| 2013/0132091 | A1 | 5/2013 | Skerpac | |
| 2014/0188468 | A1* | 7/2014 | Dyrmovskiy | G10L 17/04 704/235 |
| 2015/0029089 | A1* | 1/2015 | Kim | G06F 3/011 345/156 |
| 2015/0051913 | A1 | 2/2015 | Choi | |
| 2015/0207917 | A1* | 7/2015 | Yang | H04W 12/00 455/411 |
| 2016/0085950 | A1 | 3/2016 | Chen | |
| 2017/0316194 | A1* | 11/2017 | Wang | G06F 21/32 |

FOREIGN PATENT DOCUMENTS

| | | |
|---|---|---|
| CN | 103037310 A | 4/2013 |
| CN | 103531200 A | 1/2014 |
| CN | 103685743 A | 3/2014 |
| CN | 103729584 A | 4/2014 |
| CN | 104008320 A | 8/2014 |
| EP | 2560122 A1 | 2/2013 |
| JP | 2001337929 A | 12/2001 |
| JP | 2004094158 A | 3/2004 |
| JP | 2004279770 A | 10/2004 |
| JP | 2004287674 A | 10/2004 |
| KR | 20070006483 A | 1/2007 |
| RU | 2406163 C2 | 12/2010 |
| WO | 2011004499 A1 | 1/2011 |
| WO | 2013137503 A1 | 9/2013 |
| WO | 2014017858 A1 | 1/2014 |

* cited by examiner

APPARATUS AND METHODS FOR IMPROVING TERMINAL SECURITY

CROSS-REFERENCE TO RELATED APPLICATIONS

This application is a National Stage of International Application No. PCT/CN2015/094457, filed on Nov. 12, 2015, which claims priority to Chinese Patent Application No. 201410668497.4, filed with the Chinese Patent Office on Nov. 20, 2014 and entitled "APPARATUS AND METHOD FOR IMPROVING TERMINAL SECURITY", which is incorporated herein by reference in its entirety.

TECHNICAL FIELD

The present invention relates to the communications field, and in particular, to an apparatus and a method for improving terminal security.

BACKGROUND

To protect private content of a user in a terminal, a terminal screen is usually locked to improve terminal usage security for the user in the prior art. A fixed numeric password is usually used to unlock the terminal screen. That is, when the terminal screen needs to be unlocked, the user enters the fixed numeric password by tapping the screen to unlock the terminal screen, so that the user can completely control the terminal, including permission for the user to access private content of an owner in the terminal.

Because the fixed digital number used to unlock the terminal screen is easy to leak, the solution of using the fixed numeric password to unlock the terminal screen cannot completely protect terminal usage security for the user.

SUMMARY

Embodiments of the present invention provide an apparatus and a method for improving terminal security to improve security of a terminal.

According to a first aspect, an embodiment of the present invention provides an apparatus for improving terminal security, including: a starting module, configured to randomly generate a dynamic password, display the dynamic password on a display interface, and start a voice receiving device; a conversion and extraction module, configured to receive voice information obtained by the voice receiving device when a user reads the dynamic password on the display interface, convert the voice information into a text password, and extract a voiceprint feature of the voice information; and a processing module, configured to: obtain the text password converted by the conversion and extraction module, the voiceprint feature extracted by the conversion and extraction module, and the dynamic password generated by the starting module; and when the text password is the same as the dynamic password, determine terminal usage permission of the user according to the voiceprint feature and a prestored correspondence between terminal usage permission and a voiceprint feature, and set the display interface to an unlocked or locked state according to the determined terminal usage permission; or set the display interface to a locked state when the text password is different from the dynamic password.

With reference to the first aspect, in a first possible implementation manner, when the processing module prestores the correspondence between the terminal usage permission and the voiceprint feature, the processing module is specifically configured to: receive voice information obtained by the voice receiving device from different users, and extract voiceprint features of the voice information; and save a correspondence among the voiceprint features, user identities and terminal usage permissions according to a preceding setting.

With reference to the first possible implementation manner of the first aspect, in a second possible implementation manner of the first aspect, the saved correspondence among the voiceprint features, the user identities and the terminal usage permissions according to the preceding setting includes: for a voiceprint feature corresponding to a user whose user identity is an owner, corresponding terminal usage permission is full control; and/or for a voiceprint feature corresponding to a user whose user identity is a close person of the owner, corresponding terminal usage permission is partial control; and/or for a voiceprint feature corresponding to a user whose user identity is a stranger, corresponding terminal usage permission is control forbiddance.

With reference to the second possible implementation manner of the first aspect, in a third possible implementation manner of the first aspect, that the processing module sets the display interface to an unlocked or locked state according to the determined terminal usage permission includes: if a user identity corresponding to the user is the owner, determining, by the processing module, that the terminal usage permission of the user is full control, setting the display interface to the unlocked state, and allowing the user to access all content in the terminal; or if a user identity corresponding to the user is the close person of the owner, determining, by the processing module, that the terminal usage permission of the user is partial control, setting the display interface to the unlocked state, and allowing the user to access preset partial content in the terminal; or if a user identity corresponding to the user is the stranger, determining, by the processing module, that the terminal usage permission of the user is control forbiddance, setting the display interface to the locked state, and forbidding the user to access all content in the terminal.

With reference to the first aspect, in a fourth possible implementation manner, when the text password is the same as the dynamic password, the processing module is further configured to: when the voiceprint feature extracted by the conversion and extraction module does not exist in the prestored correspondence between the terminal usage permission and the voiceprint feature, determine that the terminal usage permission of the user is control forbiddance, set the display interface to the locked state, and forbid the user to access all content in the terminal.

With reference to the third or fourth possible implementation manner of the first aspect, in a fifth possible implementation manner of the first aspect, after the processing module determines that the terminal usage permission of the user is control forbiddance, the processing module is further configured to: receive the voice information obtained by the voice receiving device when the user reads the dynamic password on the display interface, and send the received voice information to a preset contact address; or receive the voice information obtained by the voice receiving device when the user reads the dynamic password on the display interface, and send terminal location information and the received voice information to a preset contact address; or send terminal location information to a preset contact address; or instruct the owner to remotely destroy a private file in the terminal.

In the first aspect, a dynamic password is randomly generated by a starting module, the dynamic password is displayed on a display interface, and a voice receiving device is started. Voice information obtained by the voice receiving device when a user reads the dynamic password on the display interface is received by a conversion and extraction module, the voice information is converted into a text password, and a voiceprint feature of the voice information is extracted. The text password converted by the conversion and extraction module, the voiceprint feature extracted by the conversion and extraction module, and the dynamic password generated by the starting module are obtained by a processing module. When the text password is the same as the dynamic password, terminal usage permission of the user is determined according to the voiceprint feature and a prestored correspondence between terminal usage permission and a voiceprint feature, and the display interface is set to an unlocked or locked state according to the determined terminal usage permission; or when the text password is different from the dynamic password, the display interface is set to a locked state. That is, a range of terminal content that is allowed to access by a user using a terminal is determined by double matching including password matching and user identity matching, so that a private file of an owner in the terminal is prevented from leaking, and terminal security is improved.

According to a second aspect, an embodiment of the present invention provides a method for improving terminal security, including: displaying, by a terminal, a randomly generated dynamic password on a display interface, and starting a voice receiving device of the terminal; obtaining, by the terminal by using the voice receiving device, voice information when a user reads the dynamic password, converting the voice information into a text password, and extracting a voiceprint feature of the voice information; and when the text password is the same as the dynamic password, determining, by the terminal, terminal usage permission of the user according to the voiceprint feature and a prestored correspondence between terminal usage permission and a voiceprint feature, and setting the display interface to an unlocked or locked state according to the determined terminal usage permission; or when the text password is different from the dynamic password, setting, by the terminal, the display interface to a locked state.

With reference to the second aspect, in a first possible implementation manner, the terminal prestores the correspondence between the terminal usage permission and the voiceprint feature by using the following steps. The method includes obtaining, by the terminal by using the voice receiving device, voice information of different users, and extracting voiceprint features of the voice information; and saving, by the terminal, a correspondence among the voiceprint features, user identities and terminal usage permissions according to a preceding setting.

With reference to the first possible implementation manner of the second aspect, in a second possible implementation manner of the second aspect, the correspondence among the voiceprint features, the user identities and the terminal usage permissions includes: for a voiceprint feature corresponding to a user whose user identity is an owner, corresponding terminal usage permission is full control; and/or for a voiceprint feature corresponding to a user whose user identity is a close person of the owner, corresponding terminal usage permission is partial control; and/or for a voiceprint feature corresponding to a user whose user identity is a stranger, corresponding terminal usage permission is control forbiddance.

With reference to the second possible implementation manner of the second aspect, in a third possible implementation manner of the second aspect, the setting, by the terminal, the display interface to an unlocked or locked state according to the determined terminal usage permission includes: if a user identity corresponding to the user is the owner, determining, by the terminal, that the terminal usage permission of the user is full control, setting the display interface to the unlocked state, and allowing the user to access all content in the terminal; or if a user identity corresponding to the user is the close person of the owner, determining, by the terminal, that the terminal usage permission of the user is partial control, setting the display interface to the unlocked state, and allowing the user to access preset partial content in the terminal; or if a user identity corresponding to the user is the stranger, determining, by the terminal, that the terminal usage permission of the user is control forbiddance, setting the display interface to the locked state, and forbidding the user to access all content in the terminal.

With reference to the second aspect, in a fourth possible implementation manner, when the text password is the same as the dynamic password, the method further includes: when the voiceprint feature extracted according to the voice information obtained when the user reads the dynamic password does not exist in the prestored correspondence between the terminal usage permission and the voiceprint feature, determining, by the terminal, that the terminal usage permission of the user is control forbiddance, setting the display interface to the locked state, and forbidding the user to access all content in the terminal.

With reference to the third or the fourth possible implementation manner of the second aspect, in a fifth possible implementation manner of the second aspect, after the terminal determines that the terminal usage permission of the user is control forbiddance, the method further includes: sending, by the terminal, to a preset contact address, the voice information obtained by using the voice receiving device when the user reads the dynamic password; or sending, by the terminal, to a preset contact address, the voice information obtained by using the voice receiving device when the user reads the dynamic password, and terminal location information; or sending, by the terminal, terminal location information to a preset contact address; or instructing, by the terminal, the owner to remotely destroy a private file in the terminal.

In the second aspect, a terminal displays a randomly generated dynamic password on a display interface, and starts a voice receiving device of the terminal. The terminal obtains, by using the voice receiving device, voice information when a user reads the dynamic password, converts the voice information into a text password, and extracts a voiceprint feature of the voice information. According to a matching result of the text password and the dynamic password, and a matching result of the voiceprint feature and a prestored correspondence between terminal usage permission and a voiceprint feature, the display interface of the terminal is set to an unlocked or locked state, and terminal usage permission of the user is determined. That is, a range of terminal content that is allowed to access by a user using a terminal is determined by double matching including password matching and user identity matching, so that a private file of an owner in the terminal is prevented from leaking, and terminal security is improved.

DETAILED DESCRIPTION OF ILLUSTRATIVE EMBODIMENTS

Embodiments of the present invention provide an apparatus and a method for improving terminal security to improve security of a terminal.

The terminal in the embodiments of the present invention includes a smart phone (SP), a personal digital mobile terminal (Pad), or the like. An operating system of the terminal may be one of the following operating systems: Android, Symbian, IOS (a mobile operating system of Apple Inc, that is, an operating system of an iPhone mobile phone), Windows Phone (an operating system of a Microsoft mobile phone), BlackBerry (an operating system of a BlackBerry mobile phone), or the like, but is not limited to the systems described above.

Figure 1:
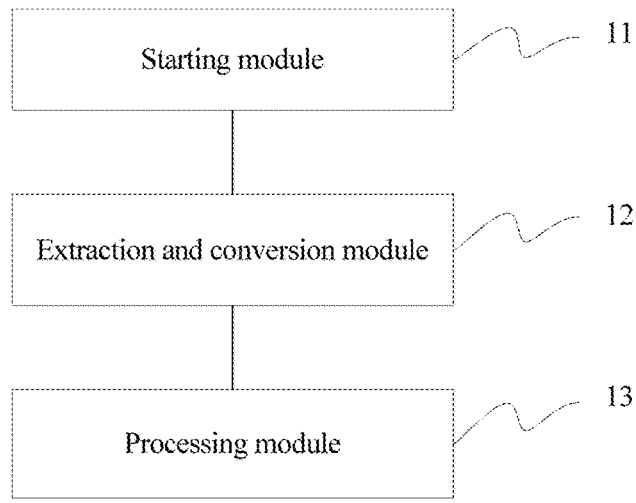
FIG. 1 is a schematic structural diagram of an apparatus for improving terminal security according to an embodiment of the present invention.

As shown in FIG. 1, an embodiment of the present invention provides an apparatus for improving terminal security, including: a starting module 11, configured to randomly generate a dynamic password, display the dynamic password on a display interface, and start a voice receiving device; a conversion and extraction module 12, configured to receive voice information obtained by the voice receiving device when a user reads the dynamic password on the display interface, convert the voice information into a text password, and extract a voiceprint feature of the voice information; and a processing module 13, configured to: obtain the text password converted by the conversion and extraction module 12, the voiceprint feature extracted by the conversion and extraction module 12, and the dynamic password generated by the starting module 11; and when the text password is the same as the dynamic password, determine terminal usage permission of the user according to the voiceprint feature and a prestored correspondence between terminal usage permission and a voiceprint feature, and set the display interface to an unlocked or locked state according to the determined terminal usage permission; or set the display interface to a locked state when the text password is different from the dynamic password.

Preferably, when the processing module 13 prestores the correspondence between the terminal usage permission and the voiceprint feature, the processing module 13 is specifically configured to: receive voice information obtained by the voice receiving device from different users, and extract voiceprint features of the voice information; and save a correspondence among the voiceprint features, user identities and terminal usage permissions according to a preceding setting. The correspondence among the voiceprint features, the user identities and the terminal usage permissions may be saved herein according to a setting of an owner, or the correspondence among the voiceprint features, the user identities and the terminal usage permissions may be saved according to a preceding setting in the terminal.

Preferably, the saved correspondence among the voiceprint features, the user identities and the terminal usage permissions according to the preceding setting includes: for a voiceprint feature corresponding to a user whose user identity is an owner, corresponding terminal usage permission is full control; and/or for a voiceprint feature corresponding to a user whose user identity is a close person of the owner, corresponding terminal usage permission is partial control; and/or for a voiceprint feature corresponding to a user whose user identity is a stranger, corresponding terminal usage permission is control forbiddance.

Preferably, that the processing module 13 sets the display interface to an unlocked or locked state according to the determined terminal usage permission includes: if a user identity corresponding to the user is the owner, determining, by the processing module 13, that the terminal usage permission of the user is full control, setting the display interface to the unlocked state, and allowing the user to access all content in the terminal; or if a user identity corresponding to the user is the close person of the owner, determining, by the processing module 13, that the terminal usage permission of the user is partial control, setting the display interface to the unlocked state, and allowing the user to access preset partial content in the terminal; or if a user identity corresponding to the user is the stranger, determining, by the processing module 13, that the terminal usage permission of the user is control forbiddance, setting the display interface to the locked state, and forbidding the user to access all content in the terminal.

Preferably, when the text password is the same as the dynamic password, the processing module 13 is further configured to: when the voiceprint feature extracted by the conversion and extraction module 12 does not exist in the prestored correspondence between the terminal usage permission and the voiceprint feature, determine that the terminal usage permission of the user is control forbiddance, set the display interface to the locked state, and forbid the user to access all content in the terminal.

Preferably, after the processing module 13 determines that the terminal usage permission of the user is control forbiddance, the processing module 13 is further configured to: receive the voice information obtained by the voice receiving device when the user reads the dynamic password on the display interface, and send the received voice information to a preset contact address; or receive the voice information obtained by the voice receiving device when the user reads the dynamic password on the display interface, and send terminal location information and the received voice information to a preset contact address; or send terminal location information to a preset contact address; or instruct the owner to remotely destroy a private file in the terminal.

In Embodiment 1 of the present invention, a range of terminal content that is allowed to access by a user using a terminal is determined by double matching including password matching and user identity matching, so that a private file of an owner in the terminal is prevented from leaking, and terminal security is improved.

Embodiment 2

Figure 2:
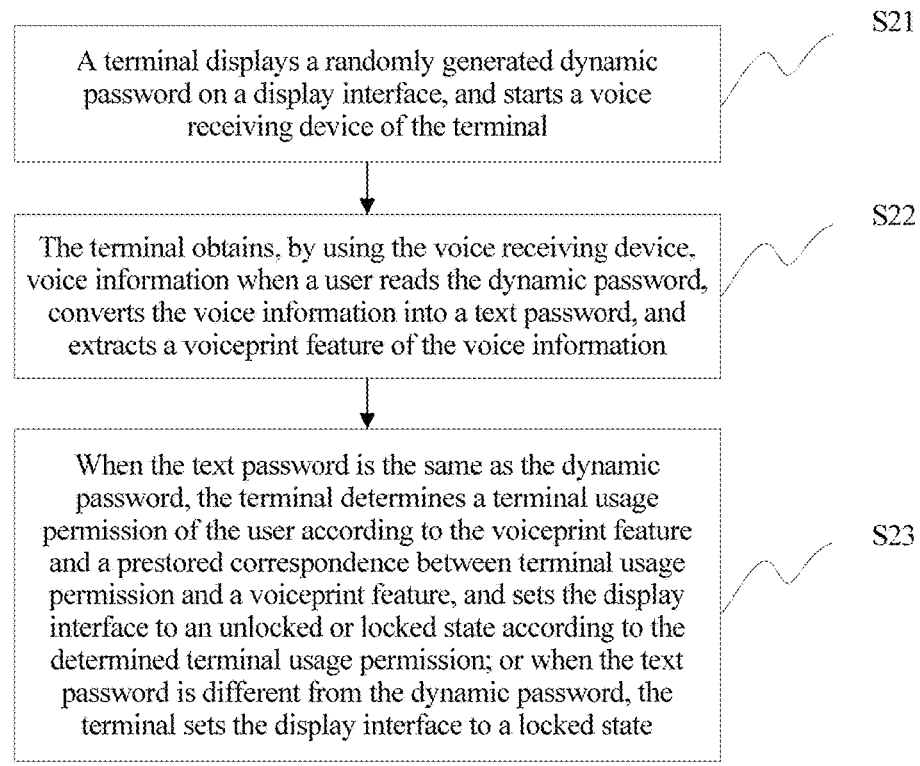
FIG. 2 is a schematic flowchart of a method for improving terminal security according to an embodiment of the present invention.

In this embodiment of the present invention, a terminal needs to have functions of locking a display interface, generating a dynamic password, obtaining voice, and recognizing a voiceprint. As shown in FIG. 2, this embodiment of the present invention provides a method for improving terminal security, including the following steps.

S21. The terminal displays a randomly generated dynamic password on a display interface, and starts a voice receiving device of the terminal.

When a user needs to use the terminal, the user may light up the display interface of the terminal by tapping a terminal button or double tapping the display interface. While the user lights up the display interface of the terminal, the terminal is triggered to display the randomly generated dynamic password on the display interface, and the terminal is triggered to start the voice receiving device of the terminal.

Figure 3A:
FIG. 3a is an effect diagram of a terminal display interface according to an embodiment of the present invention.
Figure 3B:
FIG. 3b is an effect diagram of a terminal display interface according to an embodiment of the present invention.

The dynamic password may be randomly generated by the terminal before lighting up the display interface or while lighting up the display interface, for example, the dynamic password may be generated by using a random (Random) function in a C language. A length of the dynamic password may usually be four bits or eight bits, or may be not fixed. Component elements of the dynamic password may be one or a combination of numbers, Chinese zodiac characters and English letters. For example, FIG. 3a and FIG. 3b show effect diagrams of the display interface of the terminal. In FIG. 3a, the dynamic password includes eight English letters, and in FIG. 3b, the dynamic password includes eight Chinese zodiac characters. It should be noted that, the length and the component elements of the dynamic password in this embodiment of the present invention are not limited to the foregoing content. The voice receiving device of the terminal may be a microphone MIC in the terminal, or may be another device that has a function of obtaining voice information.

S22. The terminal obtains, by using the voice receiving device, voice information when a user reads the dynamic password, converts the voice information into a text password, and extracts a voiceprint feature of the voice information.

After the display interface of the terminal is lit up, the user reads the dynamic password on the display interface according to an instruction of the terminal. Simultaneously, a voice receiving device of the terminal obtains the voice information when the user reads the dynamic password, converts the voice information into the text password, and extracts the voiceprint feature of the voice information. After the voice receiving device of the terminal receives the voice information when the user reads the dynamic password, the terminal shuts down the voice receiving device.

S23. When the text password is the same as the dynamic password, the terminal determines terminal usage permission of the user according to the voiceprint feature and a prestored correspondence between terminal usage permission and a voiceprint feature, and sets the display interface to an unlocked or locked state according to the determined terminal usage permission; or when the text password is different from the dynamic password, the terminal sets the display interface to a locked state.

Preferably, the terminal prestores the correspondence between the terminal usage permission and the voiceprint feature by using the following steps: obtaining, by the terminal by using the voice receiving device, voice information of different users, and extracting a voiceprint feature of each piece of voice information; and saving, by the terminal, a correspondence among the voiceprint features, user identities and terminal usage permissions according to a preceding setting. The correspondence among the voiceprint features, the user identities and the terminal usage permissions may be saved herein according to a setting of an owner, or the correspondence among the voiceprint features, the user identities and the terminal usage permissions may be saved according to a preceding setting in the terminal.

The user identities include an owner, a close person of the owner, and a stranger, and corresponding to the user identities, the terminal usage permissions include full control, partial control and control forbiddance. That is, the correspondence among the voiceprint features, the user identities and the terminal usage permissions includes: for a voiceprint feature corresponding to a user whose user identity is the owner, corresponding terminal usage permission is full control, where that the terminal usage permission is full control means that, because the user is the owner, the user obtains a usage permission of fully controlling the terminal, and the user is allowed to access all content in the terminal, including a private file of the owner, or the like; and/or for a voiceprint feature corresponding to a user whose user identity is the close person of the owner, corresponding terminal usage permission is partial control, where that the terminal usage permission is partial control means that, because the user is the close person of the owner, the user obtains a usage permission of partially controlling the terminal, and the user is allowed to access partial content in the terminal, where the partial content is preset, for example, it is preset that the close person of the owner is forbidden to access a private file in the terminal, the private file includes a picture, audio, a video, a document, or the like, and in this embodiment of the present invention, the owner may set different private files for different categories of close persons of the owner to make the terminal more user-friendly; and/or for a voiceprint feature corresponding to a user whose user identity is the stranger, corresponding terminal usage permission is control forbiddance, where that the terminal usage permission is control forbiddance means that, because the user is not the close person of the owner, the user is forbidden to access all content in the terminal.

In this embodiment of the present invention, the correspondence among the voiceprint features, the user identities and the terminal usage permissions is saved by the terminal according to the preceding setting. It should be noted that, in this embodiment of the present invention, the preset correspondence among the voiceprint features, the user identities and the terminal usage permissions is not limited to the foregoing three, and another correspondence may be set according to an actual situation.

Preferably, step S23 of the setting, by the terminal, the display interface to an unlocked or locked state according to the determined terminal usage permission includes: if a user identity corresponding to the user is the owner, determining, by the terminal, that the terminal usage permission of the user is full control, setting the display interface to the unlocked state, and allowing the user to access all content in the terminal; or if a user identity corresponding to the user is the close person of the owner, determining, by the terminal, that the terminal usage permission of the user is partial control, setting the display interface to the unlocked state, and allowing the user to access preset partial content in the terminal; or if a user identity corresponding to the user is the stranger, determining, by the terminal, that the terminal usage permission of the user is control forbiddance, setting the display interface to the locked state, and forbidding the user to access all content in the terminal.

Preferably, in step S23, when the text password is the same as the dynamic password, the method further includes: when the voiceprint feature extracted according to the voice information obtained when the user reads the dynamic password does not exist in the prestored correspondence between the terminal usage permission and the voiceprint feature, determining, by the terminal, that the terminal usage permission of the user is control forbiddance, setting the display interface to the locked state, and forbidding the user to access all content in the terminal.

Preferably, when the user identity corresponding to the user is the stranger or the extracted voiceprint feature does not exist in the prestored correspondence between the terminal usage permission and the voiceprint feature, after the terminal usage permission of the user is control forbiddance, to further protect the private file of the owner in the terminal and to improve the terminal security, a background system of the terminal may perform the following operations: sending, by the terminal, to a preset contact address (such as an email address), the voice information obtained by using the voice receiving device when the user reads the dynamic password; or sending, by the terminal, to a preset contact address, the voice information obtained by using the voice receiving device when the user reads the dynamic password, and terminal location information; or sending, by the terminal, terminal location information to a preset contact address; or instructing, by the terminal, the owner to remotely destroy the private file in the terminal (requiring the terminal to have a remote control function).

Figure 4A:
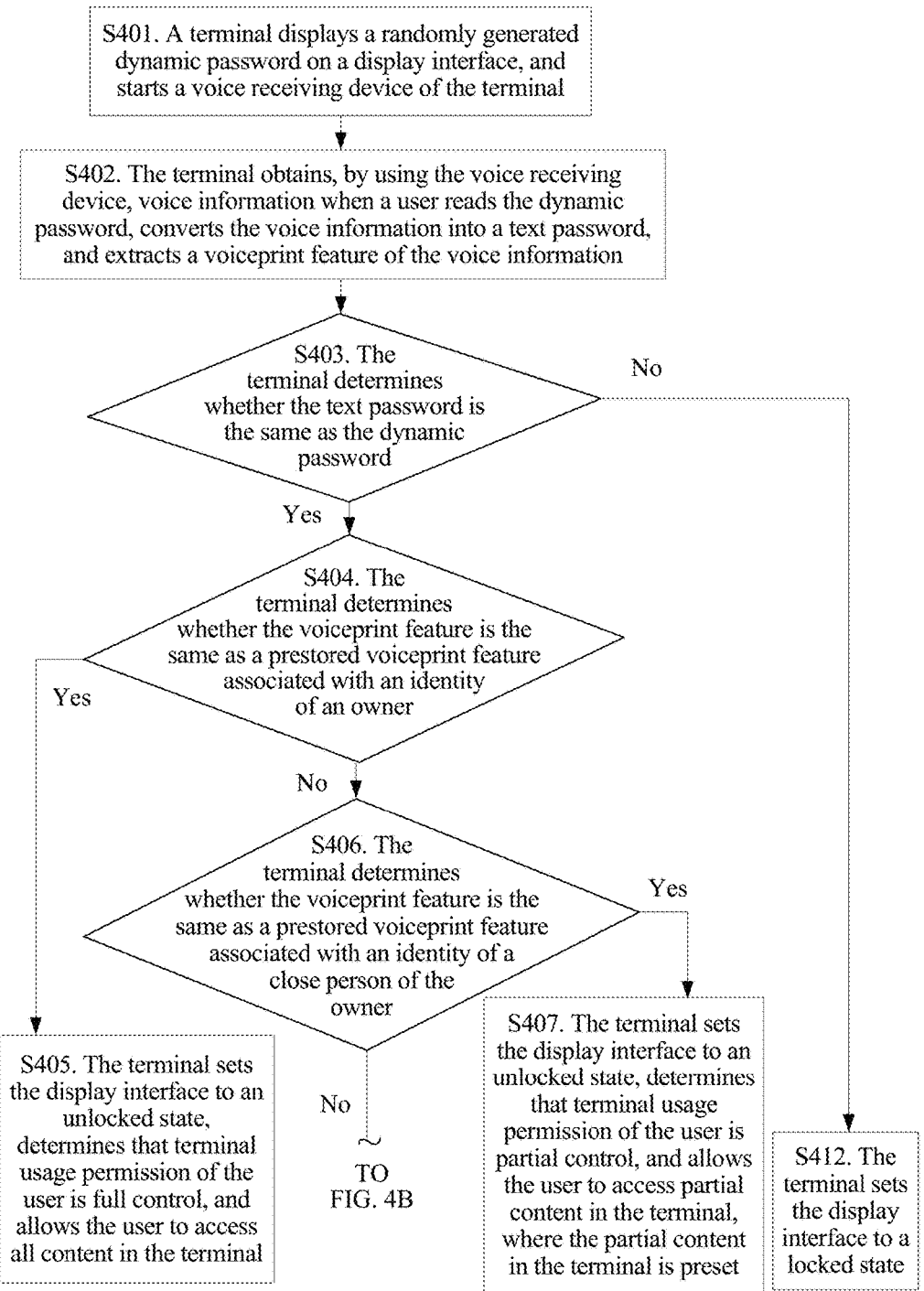
FIG. 4A and FIG. 4B are a schematic flowchart of a method for improving terminal security according to an embodiment of the present invention.
Figure 4B:
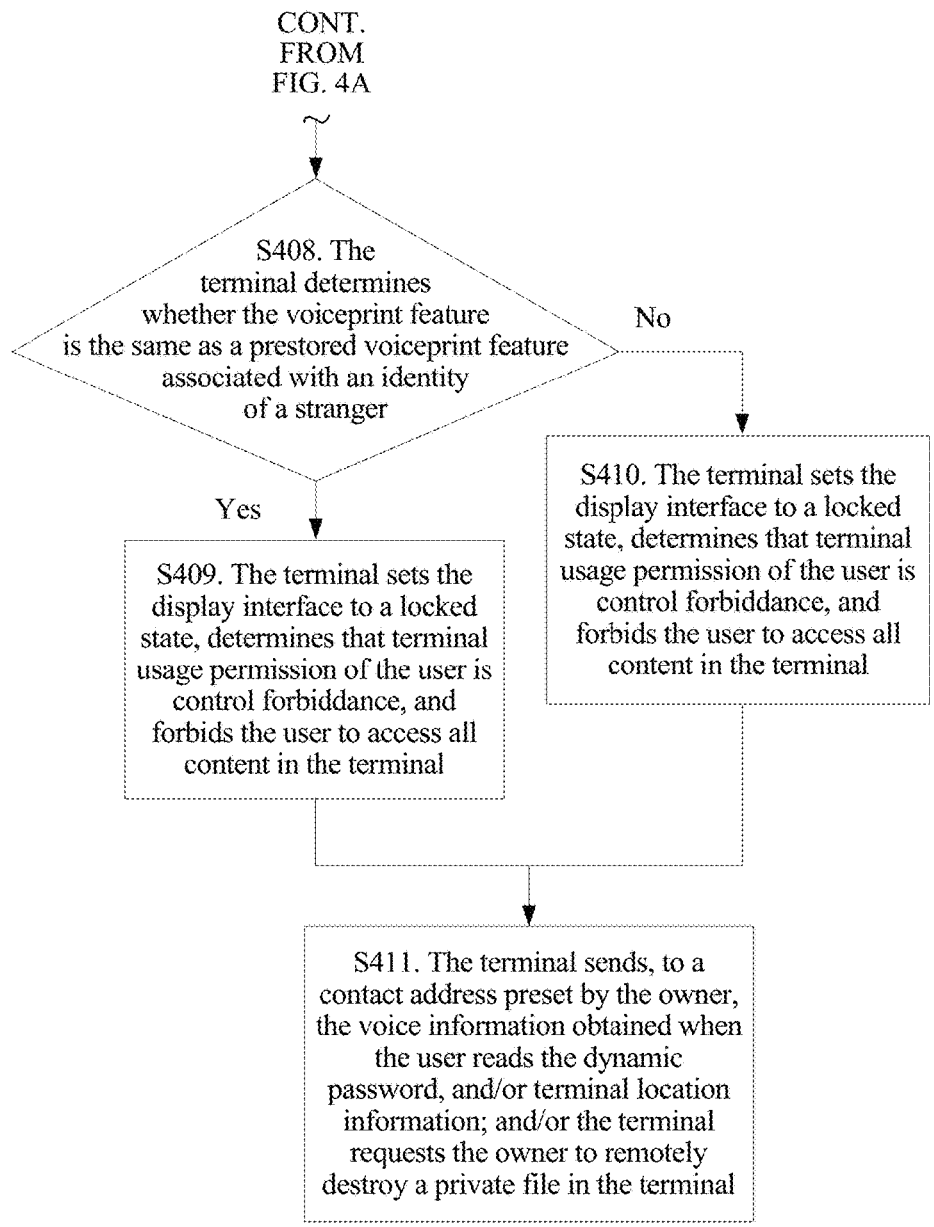

According to the method for improving terminal security in this embodiment of the present invention, whether passwords are the same and a matching result of voiceprint features are taken into full consideration to set a status of a display interface of a terminal and terminal usage permission of the user, to further improve terminal usage security. Corresponding to FIG. 2, a flowchart of the method for improving terminal security according to this embodiment of the present invention is shown in FIG. 4A and FIG. 4B, and the specific method is as follows:

S401. A terminal displays a randomly generated dynamic password on a display interface, and starts a voice receiving device of the terminal.

S402. The terminal obtains, by using the voice receiving device, voice information when a user reads the dynamic password, converts the voice information into a text password, and extracts a voiceprint feature of the voice information.

S403. The terminal determines whether the text password is the same as the dynamic password.

If the text password is the same as the dynamic password, perform step S404; if the text password is different from the dynamic password, perform step S412.

S404. The terminal determines whether the voiceprint feature is the same as a prestored voiceprint feature associated with an identity of an owner.

If the voiceprint feature is the same as the prestored voiceprint feature associated with the identity of the owner, perform step S405; if the voiceprint feature is different from the prestored voiceprint feature associated with the identity of the owner, perform step S406.

S405. The terminal sets the display interface to an unlocked state, determines that terminal usage permission of the user is full control, and allows the user to access all content in the terminal.

S406. The terminal determines whether the voiceprint feature is the same as a prestored voiceprint feature associated with an identity of a close person of the owner.

If the voiceprint feature is the same as the prestored voiceprint feature associated with the identity of the close person of the owner, perform step S407; if the voiceprint feature is different from the prestored voiceprint feature associated with the identity of the close person of the owner, perform step S408.

S407. The terminal sets the display interface to an unlocked state, determines that terminal usage permission of the user is partial control, and allows the user to access partial content in the terminal, where the partial content in the terminal is preset.

S408. The terminal determines whether the voiceprint feature is the same as a prestored voiceprint feature associated with an identity of a stranger.

If the voiceprint feature is the same as the prestored voiceprint feature associated with the identity of the stranger, perform step S409; if the voiceprint feature is different from the prestored voiceprint feature associated with the identity of the stranger, perform step S410.

S409. The terminal sets the display interface to a locked state, determines that terminal usage permission of the user is control forbiddance, and forbids the user to access all content in the terminal.

S410. The terminal sets the display interface to a locked state, determines that terminal usage permission of the user is control forbiddance, and forbids the user to access all content in the terminal.

This means that the voiceprint feature extracted according to the voice information obtained when the user reads the dynamic password does not exist in the correspondence, prestored in the terminal, between the terminal usage permission and the voiceprint feature, the user may be treated as a stranger, that is, the terminal sets the display interface to a locked state, determines that the terminal usage permission of the user is control forbiddance, and forbids the user to access all content in the terminal. The user may be treated in another manner according to a preceding setting, where strep S410 is content of the another treatment.

When the user identity corresponding to the user is the stranger or the extracted voiceprint feature does not exist in the prestored correspondence between the terminal usage permission and the voiceprint feature, after step S409 or S410, to further protect a private file of the owner in the terminal and to improve the terminal security, a background system of the terminal may perform the following operations:

S411. The terminal sends, to a contact address preset by the owner, the voice information obtained when the user reads the dynamic password, and/or terminal location information, where for example, the contact address preset by the owner may be an email address; and/or the terminal requests the owner to remotely destroy the private file in the terminal (requiring the terminal to have a remote control function).

S412. The terminal sets the display interface to a locked state.

Because the text password determined according to the voice information when the user reads the dynamic password is different from the dynamic password randomly generated by the terminal, the display interface of the terminal cannot be unlocked. In this case, a randomly generated dynamic password may be displayed on the display interface of the terminal again, so that the user may retry to unlock the display interface of the terminal by reading the dynamic password, and obtain a usage permission of the terminal. The dynamic password displayed on the terminal at this time is randomly generated, and may be the same as, or different from, the dynamic password previously displayed on the terminal.

Corresponding to the method shown in FIG. 4A and FIG. 4B, related steps of determining the user identity may be implemented by the following programs:

Struct Password Mode {
char password[2]; //Y/y: correct; N/n: fault char mode[20]; //master: owner; not_master: not owner
        char relationship [2]; //Y/y: close person of the owner;
    N/n: close person of the owner}
    In the foregoing programs, a password field value "N" or "n" indicates that the dynamic password determined according to the voice information obtained when the user reads the dynamic password is different from the dynamic password randomly generated by the terminal, and a randomly generated dynamic password may be displayed again on the display interface of the terminal. A password field value "Y" or "y" indicates that the dynamic password determined according to the voice information obtained when the user reads the dynamic password is the same as the dynamic password randomly generated by the terminal.

A mode field value "master" indicates that the user is the owner. A mode field value "not master" indicates that the user is not the owner.

A relationship field value "Y" or "y" indicates that the user is a close person of the owner. A mode field value "not master" indicates that the user is a stranger.

Before applying the method shown in FIG. 4A and FIG. 4B, the method further includes: prestoring, by the terminal, the correspondence between the terminal usage permission and the voiceprint feature.

Specific operations are as follows: receiving, by the terminal, voice information obtained by the voice receiving device from different users and extracting a voiceprint feature of each piece of the voice information; and saving, by the terminal, a correspondence among the voiceprint features, user identities and terminal usage permissions according to a preceding setting.

The correspondence among the voiceprint features, the user identities and the terminal usage permissions includes: for a voiceprint feature corresponding to a user whose user identity is an owner, corresponding terminal usage permission is full control; and/or for a voiceprint feature corresponding to a user whose user identity is a close person of the owner, corresponding terminal usage permission is partial control; and/or for a voiceprint feature corresponding to a user whose user identity is a stranger, corresponding terminal usage permission is control forbiddance.

When the correspondence that is between the terminal usage permission and the voiceprint feature and that is prestored in the terminal needs to be updated, the update is implemented by the terminal by using the foregoing method.

In Embodiment 2 of the present invention, a terminal displays a randomly generated dynamic password on a display interface, and starts a voice receiving device of the terminal. The terminal obtains, by using the voice receiving device, voice information when a user reads the dynamic password, converts the voice information into a text password, and extracts a voiceprint feature of the voice information. According to a matching result of the text password and the dynamic password, and a matching result of the voiceprint feature and a prestored correspondence between terminal usage permission and a voiceprint feature, the display interface of the terminal is set to an unlocked or locked state, and terminal usage permission of the user is determined. That is, a range of terminal content that is allowed to access by a user using a terminal is determined by double matching including password matching and user identity matching, so that a private file of an owner in the terminal is prevented from leaking, and terminal security is improved.

In a practical application of the terminal, the method provided in this embodiment of the present invention and a method for unlocking a terminal display interface in the prior art may be used together, and the user may set, according to an actual situation, whether to currently use the method provided in this embodiment of the present invention to improve practicality of the terminal.

Embodiment 3

Figure 5:
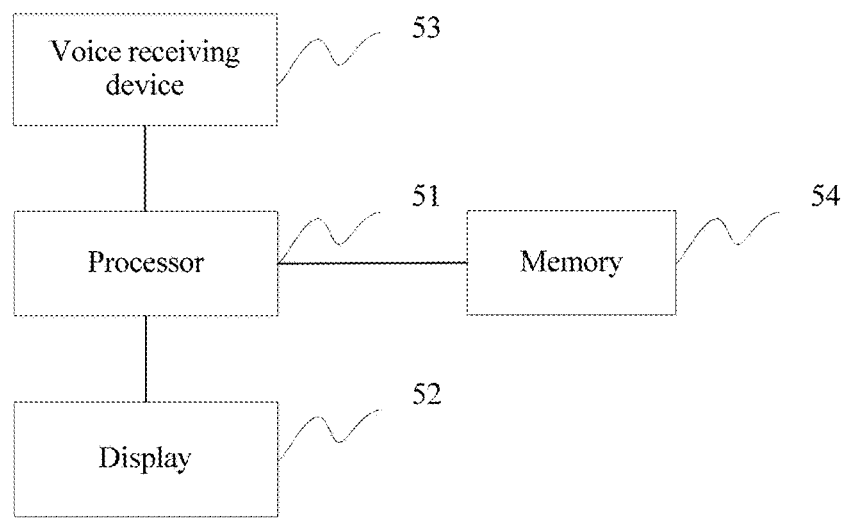
FIG. 5 is a schematic structural diagram of an apparatus for improving terminal security according to an embodiment of the present invention.

As shown in FIG. 5, an embodiment of the present invention provides an apparatus for improving terminal security, including: a processor 51, configured to randomly generate a dynamic password, trigger a display 52 to display the dynamic password, and start a voice receiving device 53; the display 52, configured to display the dynamic password randomly generated by the processor 51; the voice receiving device 53, configured to obtain voice information when a user reads the dynamic password on the display 52; and a memory 54, configured to save a correspondence between terminal usage permission and a voiceprint feature.

The processor 51 is further configured to convert the voice information obtained by the voice receiving device 53 into a text password and extract a voiceprint feature of the voice information; and when the text password is the same as the dynamic password, determine terminal usage permission of the user according to the voiceprint feature and the prestored correspondence between the terminal usage permission and the voiceprint feature, and set the display 52 to an unlocked or locked state according to the determined terminal usage permission; or set the display 52 to a locked state when the text password is different from the dynamic password.

Preferably, that the processor 51 prestores the correspondence between the terminal usage permission and the voiceprint feature specifically includes: receiving voice information obtained by the voice receiving device 53 from different users and extracting voiceprint features of the voice information; and saving, into the memory 54, a correspondence among the voiceprint features, user identities and terminal usage permissions according to a preceding setting.

Preferably, the saved correspondence among the voiceprint features, the user identities and the terminal usage permissions according to the preceding setting includes: for a voiceprint feature corresponding to a user whose user identity is an owner, corresponding terminal usage permission is full control; and/or for a voiceprint feature corresponding to a user whose user identity is a close person of the owner, corresponding terminal usage permission is partial control; and/or for a voiceprint feature corresponding to a user whose user identity is a stranger, corresponding terminal usage permission is control forbiddance.

Preferably, that the processor 51 sets the display 52 to an unlocked or locked state according to the determined terminal usage permission specifically includes: if a user identity corresponding to the user is the owner, determining, by the processor 51, that the terminal usage permission of the user is full control, setting the display 52 to the unlocked state, and allowing the user to access all content in the terminal; or if a user identity corresponding to the user is the close person of the owner, determining, by the processor 51, that the terminal usage permission of the user is partial control, setting the display 52 to the unlocked state, and allowing the user to access preset partial content in the terminal; or if a user identity corresponding to the user is the stranger, determining, by the processor 51, that the terminal usage permission of the user is control forbiddance, setting the display 52 to the locked state, and forbidding the user to access all content in the terminal.

Preferably, when the text password is the same as the dynamic password, the processor 51 is further configured to: when the voiceprint feature extracted by the processor 51 does not exist in the prestored correspondence between the terminal usage permission and the voiceprint feature, determine that the terminal usage permission of the user is control forbiddance, set the display 52 to the locked state, and forbid the user to access all content in the terminal.

Preferably, after the processor 51 determines that the terminal usage permission of the user is control forbiddance, the processor 51 is further configured to: determine to send, to a preset contact address, the voice information obtained by the voice receiving device 53 when the user reads the dynamic password on the display 52; or determine to send, to a preset contact address, the voice information obtained by the voice receiving device 53 when the user reads the dynamic password on the display 52 and terminal location information; or determine to send terminal location information to a preset contact address; or instruct the owner to remotely destroy a private file in the terminal.

In Embodiment 3 of the present invention, a range of terminal content that is allowed to access by a user using a terminal is determined by double matching including password matching and user identity matching, so that a private file of an owner in the terminal is prevented from leaking, and terminal security is improved.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An apparatus comprising:
   a non-transitory memory storage comprising instructions; and
   one or more processors in communication with the memory storage, wherein the one or more processors are configured to execute the instructions to:
   receive first voice information obtained by a voice receiving device from different users, wherein the different users belong to different groups of users;
   extract a plurality of voiceprint features of the first voice information;
   store, in the non-transitory memory storage, a correspondence among the plurality of voiceprint features, user identities of the different users belonging to the different groups of users, and terminal usage permissions according to a setting, wherein the correspondence among the plurality of voiceprint features, user identities of the different users, and terminal usage permissions comprises:
   for a voiceprint feature of the plurality of voiceprint features corresponding to a user of the different users whose user identity is an owner, a corresponding terminal usage permission is full control; and/or
   for a voiceprint feature of the plurality of voiceprint features corresponding to a user of the different users whose user identity is a close person of the owner, a corresponding terminal usage permission is partial control; and/or
   for a voiceprint feature of the plurality of voiceprint features corresponding to a user of the different users whose user identity is a stranger, a corresponding terminal usage permission is control forbiddance;
   randomly generate a dynamic password, display the dynamic password on a display interface, and start the voice receiving device;
   receive second voice information obtained by the voice receiving device when the dynamic password on the display interface is read by a user, convert the second voice information into a text password, and extract a first voiceprint feature of the second voice information;
   when the text password is the same as the dynamic password,
   determine that the user belongs to a first group of the different groups of users according to the first voiceprint feature of the second voice information; and set the display interface to an unlocked or locked state according to a first terminal usage permission associated with the first group, wherein setting the display interface to the unlocked or locked state comprises:
  when a first user identity corresponding to the user is the close person of the owner, determining that the first terminal usage permission of the user is partial control, setting the display interface to the unlocked state, and allowing the user to access preset partial content in a terminal; and
  when the text password is different from the dynamic password, set the display interface to a locked state.

2. The apparatus according to claim 1, wherein setting the display interface to the unlocked or locked state according to the first terminal usage permission further comprises:
  when the first user identity corresponding to the user is the owner, determining that the first terminal usage permission of the user is full control, setting the display interface to the unlocked state, and allowing the user to access all content in the apparatus; or
  when the first user identity corresponding to the user is the stranger, determining that the first terminal usage permission of the user is control forbiddance, setting the display interface to the locked state, and forbidding the user to access all content in the terminal.

3. The apparatus according to claim 1, wherein, when the text password is the same as the dynamic password, the one or more processors are configured to execute the instructions further to:
  when the first voiceprint feature extracted does not exist in the plurality of voiceprint features in the correspondence, determine that the first terminal usage permission of the user is control forbiddance, set the display interface to the locked state, and forbid the user to access all content in the terminal.

4. The apparatus according to claim 3, wherein the one or more processors are configured to execute the instructions further to: after determining that the first terminal usage permission of the user is control forbiddance,
  receive the second voice information obtained by the voice receiving device when the dynamic password on the display interface is read by the user, and send the received second voice information to a preset contact address; or
  receive the second voice information obtained by the voice receiving device when the dynamic password on the display interface is read by the user, and send terminal location information and the received second voice information to a preset contact address; or
  send terminal location information to a preset contact address; or
  instruct an owner of the apparatus to remotely destroy a private file in the apparatus.

5. A method for improving terminal security, the method comprising:
  receiving, by a terminal, first voice information obtained by a voice receiving device of the terminal from different users, wherein the different users belong to different groups of users;
  extracting, by the terminal, a plurality of voiceprint features of the first voice information;
  storing, by the terminal, a correspondence among the plurality of voiceprint features, user identities of the different users belonging to the different groups of users, and terminal usage permissions according to a setting, wherein the correspondence among the plurality of voiceprint features, user identities of the different users, and terminal usage permissions comprises:
    for a voiceprint feature of the plurality of voiceprint features corresponding to a user of the different users whose user identity is an owner, a corresponding terminal usage permission is full control; and/or
    for a voiceprint feature of the plurality of voiceprint features corresponding to a user of the different users whose user identity is a close person of the owner, a corresponding terminal usage permission is partial control; and/or
    for a voiceprint feature of the plurality of voiceprint features corresponding to a user of the different users whose user identity is a stranger, a corresponding terminal usage permission is control forbiddance;
  displaying, by the terminal, a randomly generated dynamic password on a display interface, and starting the voice receiving device of the terminal;
  obtaining, by the terminal by using the voice receiving device, second voice information when the dynamic password is read by a user, converting the second voice information into a text password, and extracting a first voiceprint feature of the second voice information;
  when the text password is the same as the dynamic password, determining, by the terminal, that the user belongs to a first group in the different groups of users according to the first voiceprint feature of the second voice information, and setting the display interface to an unlocked or locked state according to a first terminal usage permission pre-associated with the first group, wherein setting the display interface of the display to the unlocked or locked state comprises:
    when a first user identity corresponding to the user is the close person of the owner, determining that the first terminal usage permission of the user is partial control, setting the display interface to the unlocked state, and allowing the user to access preset partial content in the terminal; and
  when the text password is different from the dynamic password, setting, by the terminal, the display interface to a locked state.

6. The method according to claim 5, wherein the setting, by the terminal, the display interface to the unlocked or locked state according to the first terminal usage permission further comprises:
  when a user identity corresponding to the user is the owner, determining, by the terminal, that the first terminal usage permission of the user is full control, setting the display interface to the unlocked state, and allowing the user to access all content in the terminal; or
  when a user identity corresponding to the user is the stranger, determining, by the terminal, that the first terminal usage permission of the user is control forbiddance, setting the display interface to the locked state, and forbidding the user to access all content in the terminal.

7. The method according to claim 5, wherein, when the text password is the same as the dynamic password, the method further comprises:
  when the first voiceprint feature extracted according to the second voice information obtained when the dynamic password is read by the user does not exist in the plurality of voiceprint features in the correspondence, determining, by the terminal, that the first terminal usage permission of the user is control forbiddance, setting the display interface to the locked state, and forbidding the user to access all content in the terminal.

8. The method according to claim 7, wherein, after determining, by the terminal, that the first terminal usage permission of the user is control forbiddance, the method further comprises:

sending, by the terminal, to a preset contact address, the second voice information obtained by using the voice receiving device when the dynamic password is read by the user; or sending, by the terminal, to a preset contact address, the second voice information obtained by using the voice receiving device when the dynamic password is read by the user, and terminal location information; or sending, by the terminal, terminal location information to a preset contact address; or instructing, by the terminal, an owner of the terminal to remotely destroy a private file in the terminal.

9. An apparatus for improving terminal security, comprising:

a processor;

a non-transitory memory storing a program to be executed in the processor;

a display; and a voice receiving device; and wherein the program comprises instructions for:

receiving first voice information obtained by the voice receiving device from different users, wherein the different users belong to different groups of users;

extracting a plurality of voiceprint features of the first voice information;

storing, in the non-transitory memory, a correspondence among the plurality of voiceprint features, user identities of the different users belonging to the different groups of users, and terminal usage permissions according to a setting, wherein the correspondence among the plurality of voiceprint features, user identities of the different users, and terminal usage permissions comprises:

for a voiceprint feature of the plurality of voiceprint features corresponding to a user of the different users whose user identity is an owner, a corresponding terminal usage permission is full control; and/or for a voiceprint feature of the plurality of voiceprint features corresponding to a user of the different users whose user identity is a close person of the owner, a corresponding terminal usage permission is partial control; and/or for a voiceprint feature of the plurality of voiceprint features corresponding to a user of the different users whose user identity is a stranger, a corresponding terminal usage permission is control forbiddance; and randomly generating a dynamic password, triggering the display to display the dynamic password, and starting the voice receiving device;

wherein the display is configured to display the dynamic password generated randomly;

wherein the voice receiving device is configured to obtain second voice information when the dynamic password on the display is read by a user; and wherein the program further comprises instructions for:

converting the second voice information obtained by the voice receiving device into a text password and extracting a first voiceprint feature of the second voice information;

when the text password is the same as the dynamic password, determining that the user belongs to a first group in different groups of users according to the first voiceprint feature of the second voice information, and setting a display interface of the display to an unlocked or locked state according to a first terminal usage permission corresponding to the first group, wherein setting the display interface of the display to the unlocked or locked state comprises:

when a first user identity corresponding to the user is the close person of the owner, determining that the first terminal usage permission of the user is partial control, setting the display interface to the unlocked state, and allowing the user to access preset partial content in a terminal; and when the text password is different from the dynamic password, setting the display interface of the display to a locked state.

10. The apparatus according to claim 9, wherein the instructions for setting the display interface of the display to the unlocked or locked state further comprises:

when the first user identity corresponding to the user is the owner, determining, by the processor, that the first terminal usage permission of the user is full control, setting the display interface to the unlocked state, and allowing the user to access all content in the terminal.

11. The apparatus according to claim 9, wherein when the text password is the same as the dynamic password, the processor is further configured to:

when the first voiceprint feature extracted by the processor does not exist in the plurality of voiceprint features in the correspondence, determine that the first terminal usage permission for the user is control forbiddance, set the display interface of the display to the locked state, and forbid the user to access all content in the terminal.

12. The apparatus according to claim 11, wherein after the processor determines that the first terminal usage permission of the user is control forbiddance, the processor is further configured to:

determine to send, to a preset contact address, the second voice information obtained by the voice receiving device when the dynamic password on the display is read by the user; or determine to send, to a preset contact address, the second voice information obtained by the voice receiving device when the dynamic password on the display is read by the user and terminal location information; or determine to send terminal location information to a preset contact address; or instruct an owner of the apparatus to remotely destroy a private file in the terminal.

13. The apparatus according to claim 9, wherein the instructions for setting the display interface of the display to the unlocked or locked state further comprises:

when the first user identity corresponding to the user is the stranger, determining, by the processor, that the first terminal usage permission of the user is control forbiddance, setting the display interface to the locked state, and forbidding the user to access all content in the terminal.

* * * * *